United States Patent [19]

Dabby et al.

[11] 3,831,038

[45] Aug. 20, 1974

[54] PERIODIC DIELECTRIC WAVEGUIDE FOR BACKWARD PARAMETRIC INTERACTIONS

[75] Inventors: Franklin Winston Dabby, West Trenton; Ami Kestenbaum, Cranbury, both of N.J.

[73] Assignee: Western Electric Company, Incorporated, New York, N.Y.

[22] Filed: Sept. 19, 1973

[21] Appl. No.: 398,720

[52] U.S. Cl. ............... 307/88.3, 321/69 R, 330/4.6, 350/161

[51] Int. Cl. ............................................ H03f 7/00

[58] Field of Search .................. 307/88.3; 321/69 R; 330/4.5, 4.6

[56] References Cited

UNITED STATES PATENTS 3,619,796 11/1971 Seidel ................................ 330/4.6

*Primary Examiner*—Herman Karl Saalbach
*Assistant Examiner*—Darwin R. Hostetter
*Attorney, Agent, or Firm*—Bryan W. Sheffield

[57] ABSTRACT

A periodic dielectric waveguide capable of supporting backward parametric interactions comprises in one embodiment a substrate having an index of refraction $n_s$ and a layer of nonlinear dielectric material overlaid thereon. A region of the nonlinear material is treated to have a periodic index of refraction variation, the period of the variation d being given by the equation:

$$d = 2\pi m / \beta_1 + \beta_2 + \beta_3$$

where $\beta_1$, $\beta_2$, and $\beta_3$ are respectively the propagation constants of the three angle frequencies $\omega_1$, $\omega_2$, and $\omega_3$ traveling in the guide.

32 Claims, 13 Drawing Figures

PERIODIC DIELECTRIC WAVEGUIDE FOR BACKWARD PARAMETRIC INTERACTIONS

BACKGROUND OF THE INVENTION

1. Field of the Invention

Broadly speaking, this invention relates to parametric electro-magnetic devices. More particularly, in a preferred embodiment, this invention relates to periodic dielectric waveguides which are capable of supporting backward parametric interactions.

2. Discussion of the Prior Art

As is well known, traveling wave parametric devices, such as parametric amplifiers and harmonic generators, operate satisfactorily only if certain conditions are satisfied within the device. As set forth by P. K. Tien in a paper entitled, "Parametric Amplification and Frequency Mixing in Propagating Circuits," published in the Sept., 1968 issue of the *Journal of Applied Physics*, pgs, 1347–1357, these conditions are:

$$\omega_1 + \omega_2 = \omega_3 \quad (1)$$

and $$\beta_1 + \beta_2 = \beta_3 \quad (2)$$

where, $\omega_1$, $\omega_2$, and $\omega_3$ are the angular frequencies of the propagating electro-magnetic waves; and $\beta_1$, $\beta_2$, and $\beta_3$ are the corresponding propagation constants.

Equation 1 is readily satisfied as it is essentially a restatement of the law of conservation of energy. However, Equation 2, which is commonly referred to as the phase-matching equation, is more difficult to satisfy, as the non-linear optical materials which are inherently used in parametric devices are dispersive. Stated another way, for non-linear optical materials the relationship between the angular frequency $\omega$ and the propagation or phase constant is $\beta$ non-linear; thus, it is difficult if not impossible to simultaneously satisfy Equations 1 and 2 and thereby obtain satisfactory parametric interaction.

U.S. Pat. No. 3,234,475 solves this problem by the use of birefringent materials, but the requirement for birefringence limits the types of non-linear materials which can be used and is otherwise inconvenient.

U.S. Pat. No. 3,619,796, which issued on Nov. 9, 1971 to Harold Seidel discloses another technique for solving the above-described phase-matching problem. More specifically, in the Seidel patent, $\Delta\beta$, the phase error or mismatch caused by dispersion, which is defined as:

$$\Delta\beta = \beta_3 - (\beta_1 + \beta_2) \quad (3)$$

is compensated for by a spatial mixing process which takes place in a waveguide having a region, such as a grating, where there is a periodic spatial variation in the index of refraction along the direction of propagation through the guide. According to Seidel, the period $d$ of this variation is given by the equation:

$$d = (2\pi m)/\Delta\beta \quad (4)$$

where $m$ is an integer.

In most practical applications, the phase mismatch $\Delta\beta$ is quite small. Thus, the period $d$ of the grating is large compared to a wavelength of the electro-magnetic radiation. For example, if the parametric device of Seidel is used for second harmonic generation, $$d = (m\lambda_f)/2(n_{2f} - n_f) >> \lambda_f \quad (5)$$

where, $\lambda_f$ is the fundamental wavelength; and $n_f$ and $n_{2f}$ are the indices of refraction at the fundamental and second harmonic frequencies, respectively.

As is well known, the electro-magnetic radiation field within a periodic waveguide comprises an infinite number of space harmonics. For the electro-magnetic radiation to propagate successfully through the guide all space harmonics must be real. If some or all of the space harmonics are imaginary or complex, the field will scatter out of the guide and propagation will not take place.

If the grating period $d$ is such that, $$d > ([_i)/(n_e + n_s) \quad (6)$$

where, $\lambda_i$ is the shortest wavelength present in the guide;

$n_s$ is the index of refraction of the substrate upon which the non-linear material is overlaid; and $n_e$ is the effective index of refraction in the guide, some or all of the space harmonics in the guide will not be real, and the electro-magnetic radiation field will thus tend to scatter out of the waveguide for periods greater than a wavelength.

The rate at which the electro-magnetic radiation is attenuated in the guide due to this scattering depends upon the amplitude of the space harmonics, but in any event for long interaction lengths it is highly desirable to have no scattering whatsoever. As discussed above this calls for a waveguide structure in which all space harmonics are real which, as we have seen, implies that $d$, the grating period, satisfy the inequality, $$d < (\lambda_i)/(n_e + n_s) \quad (7)$$

Unfortunately, this condition cannot be met in the structure disclosed by Seidel.

SUMMARY OF THE INVENTION

As a solution to this problem, we propose a waveguide structure wherein leaky waves due to scattering are eliminated by imposing a backward direction of propagation on the wave represented by $\beta_3$ when the waves represented by $\beta_1$ and $\beta_2$ are in the forward direction.

An illustrative structure for obtaining this condition comprises a dispersive waveguide supportive of electro-magnetic wave energy having at least the angular frequencies $\omega_1$, $\omega_2$, and $\omega_3$, where $\omega_3 = \omega_1 + \omega_2$. The device further includes a uniform, non-linear material extending longitudinally along at least a portion of the guide in the direction of wave propogation, the material having a periodic index of refraction variation in the direction of wave propogation. The period $d$ of this variation is given by the equation:

$$d = 2\pi m / \beta_1 + \beta_2 + \beta_3$$

where $\beta_1$, $\beta_2$, and $\beta_3$ are, to a first order approximation, the propogation constants in the guide respectively corresponding to the angular frequencies $\omega_1$, $\omega_2$ and $\omega_3$.

The invention and its mode of operation will be more fully understood from the following detailed description and the drawings, in which:

DETAILED DESCRIPTION OF THE INVENTION

Figure 1:
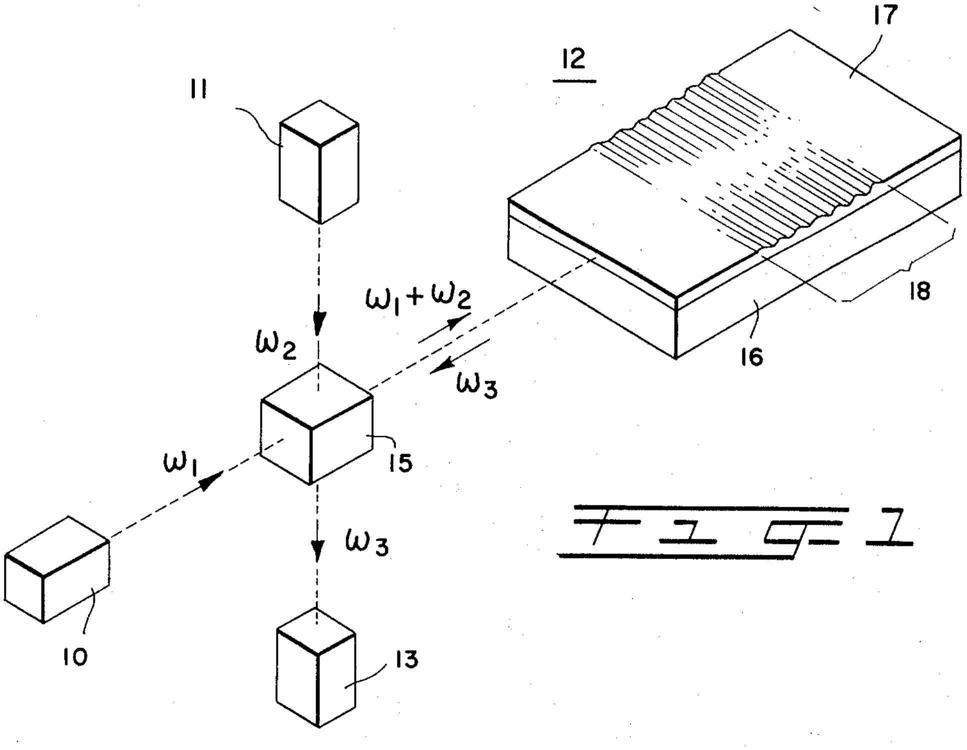
FIG. 1 is an isometric view of an illustrative parametric waveguide according to the invention.

As shown in FIG. 1, a first illustrative embodiment of the invention comprises first and second sources of electro-magnetic wave energy 10 and 11 whose output beams are combined in an optical device 15, such as a beam splitter; a parametric waveguide 12 for guiding and operating on said wave energy; and an output utilization device 13 for receiving and utilizing the transmitted wave energy. Waveguide 12 may comprise, for example, a transparent dielectric substrate 16 having an index of refraction $n_s$ upon which is deposited, or otherwise overlaid, a thin film of transparent, low-loss, dielectric material 17 which is non-linear. The index of refraction of the film is $n_f$ and, as is well known, for propagation in the guide, $n_s$ is advantageously smaller than $n_f$.

A region 18 of the waveguide is treated to induce a periodic variation in the index of refraction thereof. For example, the region may be physically corrugated or it may be treated to alter the susceptability of the dielectric material from which it is formed. Alternatively, a grating may be formed on the waveguide by indenting the surface of the film, e.g., by etching, or by the use of ion bombardment, ion exchange, etc., all of which are known techniques widely discussed in the literature. The grating, in general, can be any arrangement which induces a series of uniformly spaced periodic variations of the index of retraction along the direction of wave propagation.

The waveguide is similar in overall construction to that disclosed in the co-pending application of F. W. Dabby et al., Ser. No. 282,205, filed Aug. 21, 1972. However, many other waveguide configurations are possible. For example, the waveguide may be of the type disclosed in FIG. 1 of the above-referenced Seidel patent. or it may comprise a clad or un-clad optical fiber, and the like.

Examples of suitable non-linear material for film 17 include potasium dihydrogen phosphate (KDP), lithium niobate ($LiNO_3$) and gallium arsenide (GaAs). The particular material chosen is a function of the wavelength, as the material must, of course, be transparent at that wavelength. Since the substrate is comprised of linear material, any suitable transparent dielectric material, such as glass or fused silica may be employed for visible radiation. For non-visible, $CO_2$ laser radiation, the device may comprise, for example, a substrate of heavily doped N-type GaAs overlayed with a thin film of undoped GaAs.

Figure 2:
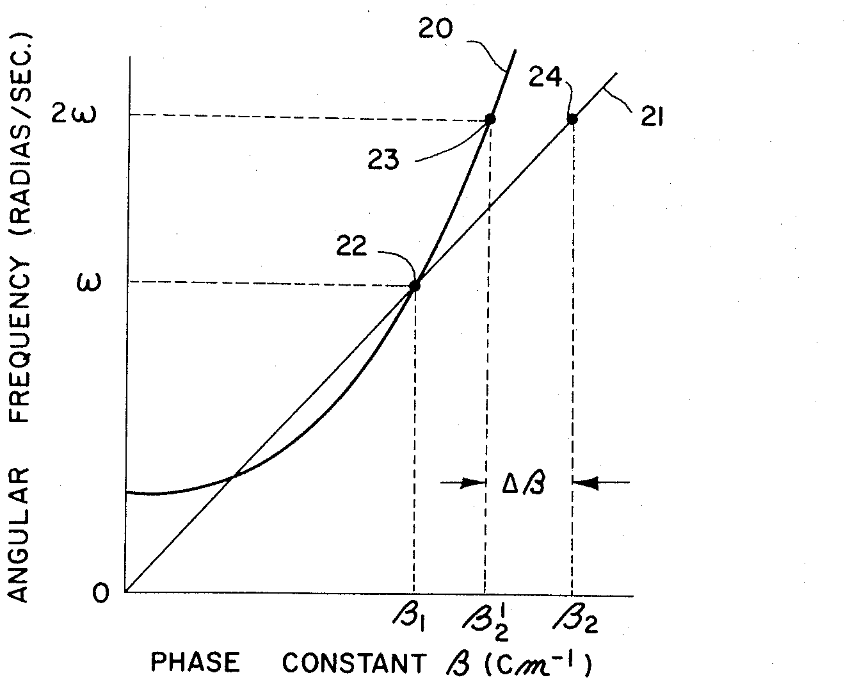
FIG. 2 is a graph showing the relationship between the angular frequency $\omega$ and phase constant $\beta$ for a typical dielectric.

FIG. 2 depicts a typical $\omega - \beta$ curve 20 and an idealized, linear $\omega - \beta$ curve 21. These curves will be useful in appreciating the problem solved by the instant invention. Assume that the parametric device is to be used as a second harmonic generator, i.e., $$\omega_2 = 2\omega_1, \tag{8}$$

then the conditions discussed by Tien require that, $$\beta_2 = 2\beta_1 \tag{9}$$

where $\beta_1$ and $\beta_2$ are respectively the phase constants of the fundamental and second harmonic frequencies. The phase constant $\beta_1$ at frequency $\omega_1$ is defined by point 22 which is common to both the actual curve 20 and the idealized curve 21. At frequency $2\omega_1$, the phase constant $\beta'_2$ defined by point 23 on curve 20, is not equal to $\beta_2$, defined by point 24 on curve 21, because of the curvature of the actual $\omega - \beta$ curve. The deficiency or phase mismatch in the harmonic wave is equal to the difference $\Delta\beta$ between the actual phase constant $\beta'_2$ defined by point 23 and the idealized phase constant $\beta_2$ defined by point 24.

Figure 3:
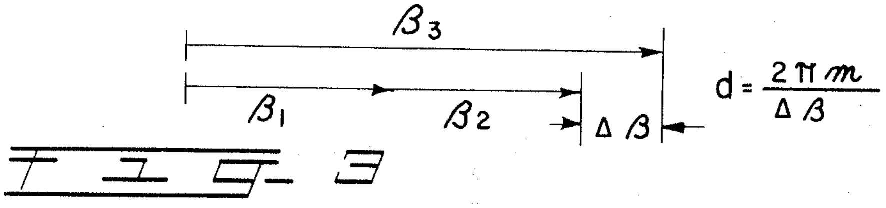
FIGS. 3 and 4 are vector diagrams illustrating the underlying principle of the invention.

As discussed, the approach taken by Seidel is to select a grating period such that:

$$d = (2\pi m)/(\Delta\beta) \tag{10}$$

that is to say, Seidel introduces a spatial mixing process into the device and this spatial mixing process is such that the "Tien conditions" are satisfied. This is illustrated in FIG. 3.

Figure 4:
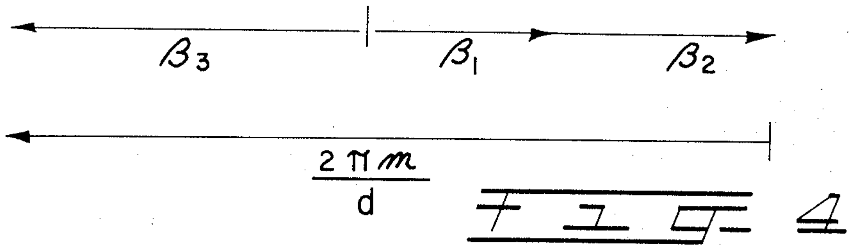
Figure 5:
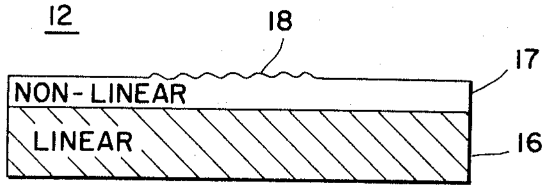
FIGS. 5–8 depict various alternate embodiments of the waveguide shown in FIG. 1.

In the instant invention, however, we propose the parametric interaction which is illustrated in FIG. 4. That is, the elimination of leaky waves due to scattering by imposing a backward direction on the wave represented by $\beta_3$ when $\beta_1$ and $\beta_2$ are in the forward direction.

The grating period required to achieve phase-matching under these circumstances is now given by:

$$d = 2\pi m / \beta_1 + \beta_2 + \beta_3 \tag{11}$$

where $m$ is an integer and $\beta_1$, $\beta_2$, and $\beta_3$ are the absolute magnitudes of the three phase vectors.

It will be noted that with the instant invention phase-matching can be achieved with a grating period which satisfies Equation 11 while at the same time satisfying the inequality, $$d < (\lambda_i)/(n_e + n_s) \quad (12)$$

which, as previously discussed, is the condition for all real space harmonics, and hence, no scattering or attenuation in the guide. For example, for second harmonic generation, $$d = (m\lambda_f)/2(n_{2f} + n_f) \quad (13)$$

which is smaller than, $$(\lambda_f)/2(n_e + n_s) \quad (14)$$

The absence of leaky waves in the waveguide according to this invention is conducive to obtaining long interaction lengths and the backward direction of travel of the wave represented by $\beta_3$ makes for easier physical separation of the electro-magnetic waves.

Although not essential to an understanding of the invention, an alternative way of explaining the phase-matching technique of the instant invention is to use the $\omega - \beta$ diagram for the periodic structure taking dispersion into account. For second harmonic generation this is illustrated in the article entitled, "Periodic Dielectric Waveguides," by F. W. Dabby, A. Kestenbaum, and U. C. Paek, which was published in *Optics Communications* in Oct., 1972. Briefly, the above-referenced article shows that the conditions $$\omega_2 = 2\omega_1 \quad (15)$$

and $$\beta_2 = 2\beta_1 \quad (16)$$

are satisfied by two points on the $\omega - \beta$ diagram. At the same time, $$d < (\lambda 2f)/(n_e + n_s) \quad (17)$$

thus avoiding leaky waves and permitting long interaction lengths.

Of course, it is feasible to make substrate 16 of non-linear material and to make thin film 17 of linear material. In this event, the parametric interaction takes place in the substrate, rather than in the thin film. Also, the grating may be formed on the upper or lower surface of the film or in the boundary between the film and the substrate. These embodiments are depicted in FIGS. 5–8, respectively.

Figure 9:
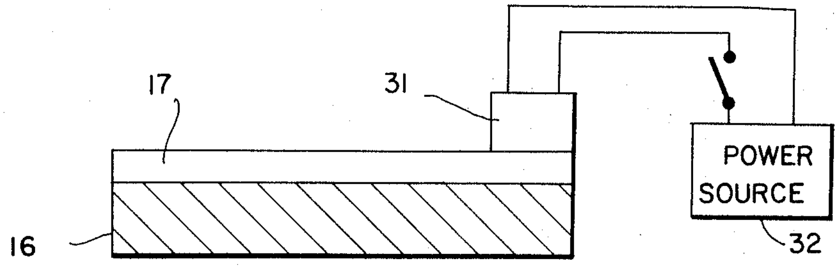
FIG. 9 depicts the use of an acoustic transducer with the waveguide shown in FIG. 1.

Further, as shown in FIG. 9, an acoustic transducer 31 may be positioned on the waveguide and coupled to a suitable power source 32 to launch an acoustic surface wave. As is well known, such an acoustic wave will induce a periodic variation in the index of refraction of the fiber. The frequency of the power source is selected such that the acoustic wavelength $\Lambda$ of the induced acoustic wave is given by the equation, $$\Lambda = 2\pi m / \beta_1 + \beta_2 + \beta_3 \quad (18)$$

Of course, the accoustic transducer may be positioned proximate the substrate or the substrate-film boundary if the substrate is comprised of the non-linear material or if the index variation occurs at the boundary rather than at the surface of the film. In this event the accoustic wave is not properly described as a surface wave.

Figure 10:
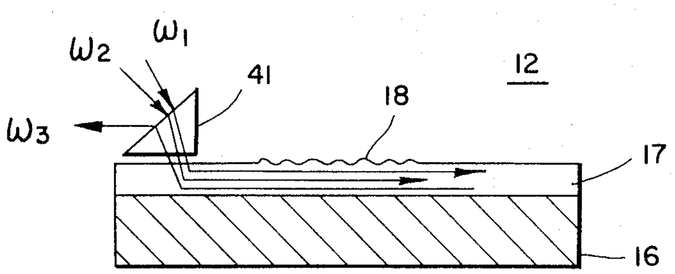
FIGS. 10 and 11 depict two illustrative techniques for launching an optical wave into the waveguide shown in FIG. 1.
Figure 11:
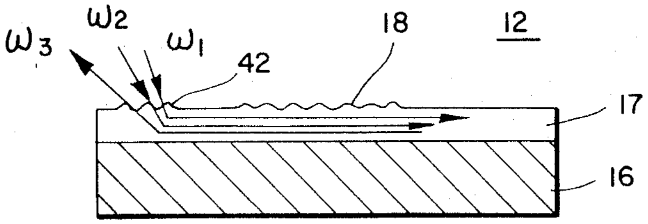

As shown in FIG. 10, waves may be coupled into the waveguide 12 by means of a prism 41 or, as shown in FIG. 11 by means of a grating 42 formed at one end of the guide. Other known means, such as aiming the beam "end-on" at the film 17 may also be employed, albeit alignment becomes more difficult.

Figure 12:
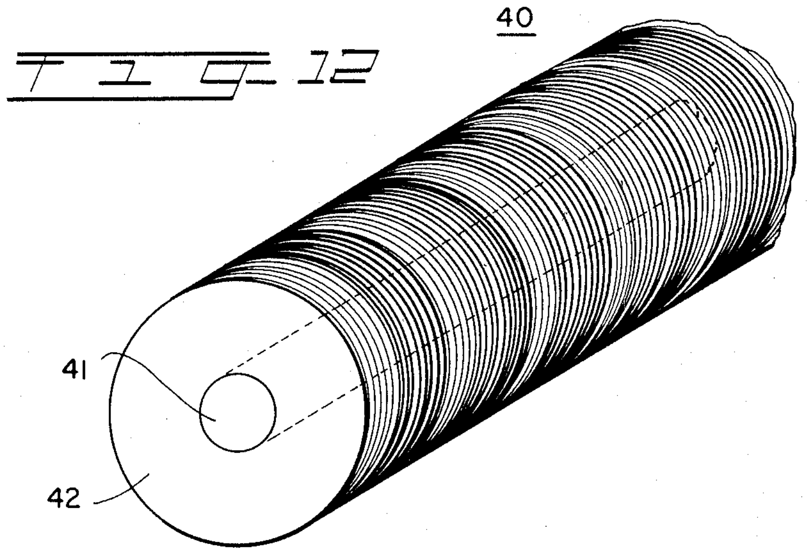
FIG. 12 depicts an alternate embodiment of the invention wherein the waveguide is an optical fiber having a periodic index variation in the cladding.

It was previously stated that many other waveguide configurations are possible, including clad optical fibers. FIG. 12 depicts an illustrative optical fiber 40 comprising a central core 41 having a cladding layer 42 thereabout. The outer surface of the cladding layer is corrugated, or otherwise treated, to yield the necessary periodic index of refraction variation in precisely the same manner discussed above for the planar guide 12. Core 41, thus, corresponds to substrate 16 in FIG. 1 while cladding layer 42 corresponds to film 17.

Figure 6:
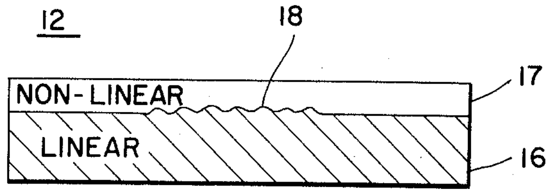
Figure 7:
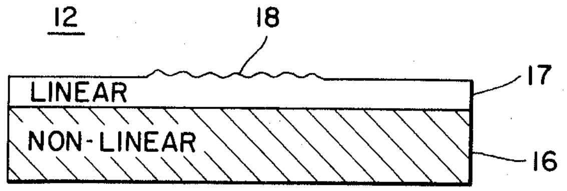
Figure 8:
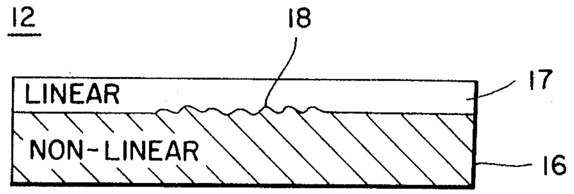
Figure 13:
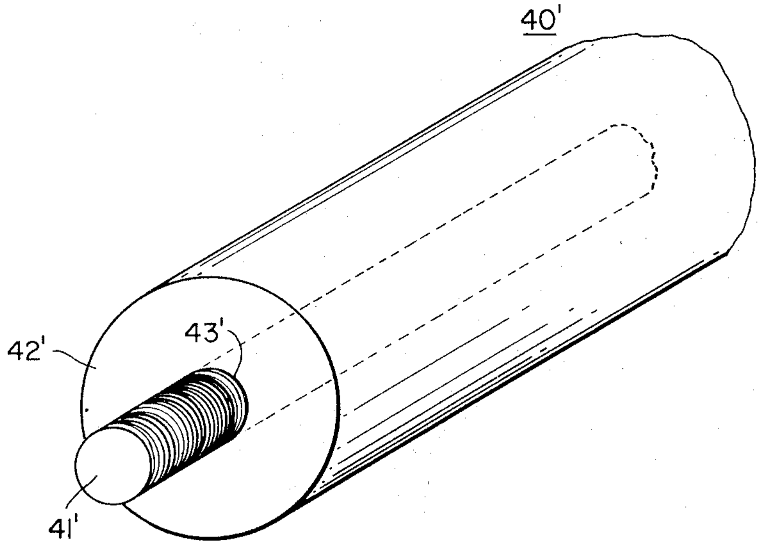
FIG. 13 depicts an optical fiber wherein the periodic index variation is in the core.

It was also priorly discussed that the corrugations in the planar guide 12 need not be at the upper surface of the film 17, but could also be at the lower surface thereof, as shown in FIGS. 6 and 8, for example. FIG. 13 illustrates how this technique is applied to the optical fiber shown in FIG. 12. As shown, fiber 40' comprises an inner core 41' having a cladding layer 42' thereabout. The interface 43' between the core 41' and cladding layer 42' is shown corrugated, in a manner entirely analogous to the way in which the interface between substrate 16 and thin film 17 is corrugated in FIG. 6, for example.

In FIG. 13, core 41' is shown extending outwardly to the left; however, this is merely for convenience in drawing. In practice, the core will not extend outwardly past the cladding layer.

One skilled in the art may make various changes and substitutions to the apparatus disclosed without departing from the spirit and scope of the invention.

What is claimed is:

1. A parametric device for traveling electro-magnetic waves comprising:

a dispersive waveguide supportive of electro-magnetic wave energy having at least the angular frequencies $\omega_1$, $\omega_2$, and $\omega_3$, where, $\omega_3 = \omega_1 + \omega_2$;

a uniform, non-linear material extending longitudinally along at least a portion of said guide in the direction of wave propagation;

said material having a periodic index of refraction variation in the direction of wave propagation, said variation having a period $d$ given by:

$d = 2\pi m / \beta_1 + \beta_2 + \beta_3$ where $m$ is an integer, and where $\beta_1$, $\beta_2$ and $\beta_3$ are, to a first approximation, the propagation constants in the guide respectively corresponding to electro-magnetic waves having the angular frequencies $\omega_1$, $\omega_2$ and $\omega_3$.

2. The device according to claim 1 where $\omega_1 = \omega_2$ and $\beta_1 = \beta_2$.

3. The device according to claim 1 wherein the periodic index of refraction variation in said material is produced by a fixed grating in said material.

4. The device according to claim 1 further comprising means for launching an acoustic surface wave along said material thereby to induce said periodic index variation.

5. The device according to claim 4 wherein said launching means comprises:

a piezo-electric transducer coupled to said material; and means for supplying an energizing potential to said transducer from an external source.

6. A waveguide for parametric interactions, said waveguide supporting electro-magnetic wave propagation at at least three angular frequencies, $\omega_1$, $\omega_2$, and $\omega_3$, where $\omega_1 + \omega_2 = \omega_3$, said waveguide comprising:

a substrate of dielectric material having an index of refraction $n_s$; and a film of non-linear dielectric material overlaid on said substrate, said film having an index of refraction $n_f$ where $n_s < n_f$, at least a portion of said film having a periodic index of refraction variation in a direction in which electro-magnetic radiation propagates in the guide, said variation having a period $d$ given by $d = 2\pi m / \beta_1 + \beta_2 + \beta_3$ where $m$ is an integer, and where $\beta_1$, $\beta_2$ and $\beta_3$ are respectively, to a first approximation, the propagation constants of the three electro-magnetic waves in the guide, the period of the variation also satisfying the equation $d < \lambda_i/(n_e + n_s)$ where $\lambda_i$ is the shortest wavelength of electro-magnetic radiation involved in the parametric interaction and $n_e$ is its effective index of refraction in the guide.

7. The waveguide according to claim 6 wherein said periodic variation is induced by a corrugation in the upper surface of the film.

8. The waveguide according to claim 6 wherein said periodic variation is induced by a grating in the upper surface of the film.

9. The waveguide according to claim 6 wherein said periodic index variation is induced by a plurality of discontinuities longitudinally spaced along the upper surface thereof, said discontinuities being spaced apart by the distance $d$.

10. The waveguide according to claim 6 wherein said periodic variation comprises a periodic variation in the non-linear or linear susceptability of said non-linear material.

11. The waveguide according to claim 6 wherein said periodic index variation is induced by a corrugation at the boundary between said substrate and said film.

12. The waveguide according to claim 6 wherein said periodic index variation is induced by a grating at the boundary between said substrate and said film.

13. The waveguide according to claim 6 wherein said periodic index variation is induced by a plurality of longitudinally spaced discontinuities at the boundary between said substrate and said film, said discontinuities being spaced apart by the distance $d$.

14. The waveguide according to claim 6 further including means for launching an acoustic surface wave in said film, said wave having a wavelength given by the equation $\Lambda = 2\pi m / \beta_1 + \beta_2 + \beta_3$ thereby inducing said periodic index variation.

15. The waveguide according to claim 6 further including:

means for introducing into said waveguide the electro-magnetic waves to be parametrically interacted; and means for extracting from said waveguide the results of said interaction.

16. The waveguide according to claim 15 wherein said introducing and extracting means comprise a prism coupler mounted to said film.

17. The waveguide according to claim 15 wherein said introducing and extracting means comprise a grating.

18. A waveguide for parametric interactions, said waveguide supporting electro-magnetic wave propagation at at least three angular frequencies, $\omega_1$, $\omega_2$, and $\omega_3$, where $\omega_1 + \omega_2 = \omega_3$, said waveguide comprising:

a substrate of non-linear dielectric material having an index of refraction $n_s$; and a film of linear dielectric material overlaid on said substrate, said film having an index of refraction $n_f$ where $n_s < n_f$, at least a portion of said film having a periodic index of refraction variation in a direction in which electro-magnetic radiation propagates in the guide, said variation having a period $d$ given by $d = 2\pi m / \beta_1 + \beta_2 + \beta_3$ where $m$ is an integer, and where $\beta_1$, $\beta_2$ and $\beta_3$ are respectively, to a first approximation, the propagation constants of the three electro-magnetic waves in the guide, the period of the variation also satisfying the equation $d < \lambda_i/(n_e + n_s)$ where $\lambda_i$ is the shortest wavelength of electro-magnetic radiation involved in the parametric interaction and $n_e$ is its effective index of refraction in the guide.

19. The waveguide according to claim 18 wherein said periodic variation is induced by a corrugation in the upper surface of the film.

20. The waveguide according to claim 18 wherein said periodic variation is induced by a grating in the upper surface of the film.

21. The waveguide according to claim 18 wherein said periodic index variation is induced by a plurality of discontinuities longitudinally spaced along the upper surface thereof, said discontinuities being spaced apart by the distance $d$.

22. The waveguide according to claim 18 wherein said periodic variation comprises a periodic variation in the susceptibility of said non-linear material.

23. The waveguide according to claim 18 wherein said periodic index variation is induced by a corrugation at the boundary between said substrate and said film.

24. The waveguide according to claim 18 wherein said periodic index variation is induced by a grating at the boundary between said substrate and said film.

25. The waveguide according to claim 18 wherein said periodic index variation is induced by a plurality of longitudinally spaced discontinuities at the boundary between said substrate and said film, said discontinuities being spaced apart by the distance *d*.

26. The waveguide according to claim 18 further including means for launching an acoustic surface wave in said film, said wave having a wavelength given by the equation $\Lambda = 2\pi m/\beta_1 + \beta_2 + \beta_3$ thereby inducing said periodic index variation.

27. The waveguide according to claim 18 further including:

means for introducing into said waveguide the electro-magnetic waves to be parametrically interacted; and means for extracting from said waveguide the results of said interaction.

28. The waveguide according to claim 27 wherein said introducing and extracting means comprise a prism coupler mounted to said film.

29. The waveguide according to claim 27 wherein said introducing and extracting means comprise a grating.

30. The device according to claim 1 wherein the propagating electro-magnetic waves are confined in one transverse direction.

31. The device according to claim 1 wherein the propagating electro-magnetic waves are confined in two transverse directions.

32. The device according to claim 1 wherein said device is a clad optical fiber.

* * * * *

566-PT
(6-69)

UNITED STATES PATENT OFFICE
CERTIFICATE OF CORRECTION atent No. 3,831,038 Dated August 20, 1974 ventor(s) F. W. Dabby et al.

It is certified that error appears in the above-identified patent and that said Letters atent are hereby corrected as shown below:

In the abstract, line 9, that portion of the equation reading "$\beta_1 + \beta_2 + \beta_3$" should read --$|\beta_1| + |\beta_2| + |\beta_3|$--.

In the specification, Column 2, equation (6), "$d > ([_i)/(n_e + n_s)$" should read --$d > (\lambda_i)/(n_{e_i} + n_s)$--; line 37, "$n_e$" should read --$n_{e_i}$--; equation (7), that portion of the equation reading "$(n_e + n_s)$" should read --$(n_{e_i} + n_s)$--. Column 3, line 8, that portion of the equation reading "$\beta_1 + \beta_2 + \beta_3$" should read --$|\beta_1| + |\beta_2| + |\beta_3|$--. Column 4, line 39, "not" should read --not--; line 59, "backward" should read --backward--; equation (11), that portion of the equation reading "$\beta_1 + \beta_2 + \beta_3$" should read --$|\beta_1| + |\beta_2| + |\beta_3|$--. Column 5, line 1, "$\beta_1$, $\beta_2$, and $\beta_3$" should read --$|\beta_1|$, $|\beta_2|$, and $|\beta_3|$--; equation (12), that portion of the equation reading "$(n_e + n_s)$" should read --$(n_{e_i} + n_s)$--; line 60, "upper or lower" should read --upper or lower--. Column 6, equation (18), that portion of the equation reading "$\beta_1 + \beta_2 + \beta_3$" should read --$|\beta_1| + |\beta_2| + |\beta_3|$--; line 14, "accoustic" should read --acoustic--.

F-566-PT
(6-69)

UNITED STATES PATENT OFFICE
CERTIFICATE OF CORRECTION

Patent No. 3,831,038 Dated August 20, 1974

Inventor(s) F. W. Dabby et al. Page - 2

It is certified that error appears in the above-identified patent and that said Letters Patent are hereby corrected as shown below:

In the claims, Column 6, line 64, that portion of the equation reading "$\beta_1 + \beta_2 + \beta_3$" should read --$|\beta_1| + |\beta_2| + |\beta_3|$, --. Column 7, line 32, that portion of the equation reading "$\beta_1 + \beta_2 + \beta_3$" should read --$|\beta_1| + |\beta_2| + |\beta_3|$, --; line 38, that portion of the equation reading "$(n_e + n_s)$" should read --$(n_{e_i} + n_s)$--; line 40, "$n_e$" should read --$n_{e_i}$--. Column 8, line 5, that portion of the equation reading "$\beta_1 + \beta_2 + \beta_3$" should read --$|\beta_1| + |\beta_2| + |\beta_3|$--; line 34, that portion of the equation reading "$\beta_1 + \beta_2 + \beta_3$" should read --$|\beta_1| + |\beta_2| + |\beta_3|$, --; line 40, that portion of the equation reading "$(n_e + n_s)$" should read --$(n_{e_i} + n_s)$--; line 42, "$n_e$" should read --$n_{e_i}$--. Column 9, line 7, that portion of the equation reading "$\beta_1 + \beta_2 + \beta_3$" should read --$|\beta_1| + |\beta_2| + |\beta_3|$--.

Signed and sealed this 29th day of October 1974.

(SEAL)
Attest:

McCOY M. GIBSON JR.
Attesting Officer

C. MARSHALL DANN
Commissioner of Patents